US012566424B2

(12) United States Patent (10) Patent No.: US 12,566,424 B2
Kozuka et al. (45) Date of Patent: Mar. 3, 2026

(54) CUTTING SUPPORT APPARATUS, CUTTING PATTERN GENERATION METHOD, AND CUTTING SYSTEM

(71) Applicant: ASICS CORPORATION, Kobe (JP)

(72) Inventors: Yuya Kozuka, Kobe (JP); Genki Hatano, Kobe (JP); Naoto Iwashita, Kobe (JP); Shingo Takashima, Kobe (JP); Shinsaku Wakasugi, Kobe (JP)

(73) Assignee: ASICS CORPORATION, Kobe (JP)

( * ) Notice: Subject to any disclaimer, the term of this patent is extended or adjusted under 35 U.S.C. 154(b) by 724 days.

(21) Appl. No.: 17/931,817

(22) Filed: Sep. 13, 2022

(65) Prior Publication Data

US 2023/0078348 A1 Mar. 16, 2023

(30) Foreign Application Priority Data

Sep. 14, 2021 (JP) ................................. 2021-149535

(51) Int. Cl.
*G05B 19/4155* (2006.01)
*A43D 8/02* (2006.01)

(52) U.S. Cl.
CPC ........... *G05B 19/4155* (2013.01); *A43D 8/02* (2013.01); *G05B 2219/37355* (2013.01)

(58) Field of Classification Search
CPC ...... G05B 19/4155; G05B 2219/37355; G05B 2219/35027; G05B 2219/35162;
(Continued)

(56) References Cited

U.S. PATENT DOCUMENTS 5,661,864 A * 9/1997 Valiant ..................... A43D 3/00
36/114
5,700,177 A * 12/1997 Lemelson ................. A63F 9/12
273/156
(Continued)

FOREIGN PATENT DOCUMENTS

CN 109732913 A 5/2019
JP H09-128422 A 5/1997

OTHER PUBLICATIONS

Autodesk. "Slicer for Fusion 360." Internet Archive, Sep. 29, 2020, pp. 16-17 (Year: 2020).*
(Continued)

*Primary Examiner* — Robert E Fennema
*Assistant Examiner* — Magdalena I Kossek
(74) *Attorney, Agent, or Firm* — Studebaker Brackett PLLC

(57) ABSTRACT

A cutting support apparatus includes an input unit that receives shoe last data, a storage in which a shape and a type of a plurality of plate-like parts are stored, a processor that generates a cutting pattern for cutting the plurality of plate-like parts from a plate-like member having a predetermined size based on the shoe last data and the shape of the plurality of plate-like parts, and an output unit that outputs the cutting pattern. The processor divides an area of the plate-like parts to be arranged in the plate-like member into a plurality of areas in accordance with the type of the plate-like parts that form the shoe last, determines positions of the plurality of plate-like parts to be arranged in each of the areas based on an arrangement condition, and generates the cutting pattern.

17 Claims, 11 Drawing Sheets

(58) Field of Classification Search
CPC ........... G05B 2219/45229; G05B 2219/45243;
G05B 2219/49366; G05B 19/4097; A43D
8/02; A43D 2200/60; A43D 1/025; A43D
3/027; A43D 8/00; A43D 8/12; A43D
999/00; G06F 2111/16; G06F 30/17;
B26F 1/3813; B26F 3/004; B26D
2005/002; B26D 5/00
See application file for complete search history.

(56) References Cited

U.S. PATENT DOCUMENTS

| | | | | |
|---|---|---|---|---|
| 6,980,934 | B1 * | 12/2005 | Sadovnik | G06F 30/13 |
| | | | | 206/505 |
| 2002/0092389 | A1 * | 7/2002 | Feldman | B26D 5/00 |
| | | | | 83/56 |
| 2004/0168329 | A1 * | 9/2004 | Ishimaru | A43D 1/025 |
| | | | | 33/3 R |
| 2005/0122346 | A1 * | 6/2005 | Horn | G06F 30/00 |
| | | | | 345/629 |
| 2007/0240548 | A1 * | 10/2007 | Pape | B26D 5/00 |
| | | | | 83/76.1 |
| 2010/0268373 | A1 * | 10/2010 | Tremoureux | G06Q 10/043 |
| | | | | 700/187 |
| 2016/0206049 | A1 | 7/2016 | Kallayil | |
| 2017/0368706 | A1 * | 12/2017 | Zünd | G06F 3/017 |
| 2018/0014609 | A1 | 1/2018 | Bruce et al. | |
| 2023/0241526 | A1 * | 8/2023 | Landau | A63H 33/084 |
| | | | | 446/124 |

OTHER PUBLICATIONS

An Office Action; "Notice of Reasons for Refusal," mailed by the Japanese Patent Office on Apr. 1, 2025, which corresponds to Japanese Patent Application No. 2021-149535 and is related to U.S. Appl. No. 17/931,817; with English language translation.

* cited by examiner

2N3
2N2
2N1

2A
2b
2H
2c   2d

1

CUTTING SUPPORT APPARATUS, CUTTING PATTERN GENERATION METHOD, AND CUTTING SYSTEM

This nonprovisional application is based on Japanese Patent Application No. 2021-149535 filed with the Japan Patent Office on Sep. 14, 2021, the entire contents of which are hereby incorporated by reference.

BACKGROUND OF THE INVENTION

Field of the Invention

The present disclosure relates to a cutting support apparatus, a cutting pattern generation method, and a cutting system.

Description of the Background Art

When manufacturing a custom-made shoe tailored to a foot of a user, a shoe last should be made in conformity with a foot shape measured with a measuring apparatus. US Patent Publication No. 2018/0014609 discloses manufacturing of footwear within a portable housing. US Patent Publication No. 2016/0206049 discloses a last pre-form that can be reformed with the use of a shape memory polymer. Chinese Patent No. 109732913 discloses formation of a shoe last by 3D printing.

SUMMARY OF THE INVENTION

In each patent literature, however, for making a shoe last dedicated for a user, a dedicated large machine has been used and time and costs have been required. In addition, in each patent literature, it has been difficult to have a user experience making of a shoe last. In order to have the user experience making of a shoe last, for example, the shoe last should be made by assembling a plurality of plate-like parts at a store or the like. In order to make a shoe last by assembling a plurality of plate-like parts at a store or the like, the plurality of plate-like parts should be prepared for facilitating assembly by the user.

The present disclosure provides a cutting support apparatus, a cutting pattern generation method, and a cutting system for generating a cutting pattern for cutting a plurality of plate-like parts from a plate-like member in making of a shoe last by assembling the plurality of plate-like parts.

A cutting support apparatus according to one aspect of the present disclosure generates a cutting pattern for cutting a plurality of plate-like parts that form a shoe last from a plate-like member. The cutting support apparatus includes an input unit that receives shoe last data, a storage unit in which a shape and a type of the plurality of plate-like parts are stored, a computing unit that generates the cutting pattern for cutting the plurality of plate-like parts from the plate-like member having a predetermined size based on the shoe last data received by the input unit and the shape of the plurality of plate-like parts stored in the storage unit, and an output unit that outputs the cutting pattern computed by the computing unit. The computing unit divides an area of plate-like parts to be arranged in the plate-like member into a plurality of areas in accordance with the type of the plate-like parts that form the shoe last, and determines positions of the plurality of plate-like parts to be arranged in each of the areas based on an arrangement condition and generates the cutting pattern.

A cutting system according to one aspect of the present disclosure generates a cutting pattern for cutting a plurality of plate-like parts that form a shoe last from a plate-like member and cuts the plurality of plate-like parts from the plate-like member based on the generated cutting pattern. The cutting system includes an input apparatus that receives shoe last data, a storage apparatus in which a shape and a type of the plurality of plate-like parts are stored, a computing apparatus that generates the cutting pattern for cutting the plurality of plate-like parts from the plate-like member having a predetermined size based on the shoe last data received by the input apparatus and the shape of the plurality of plate-like parts stored in the storage apparatus, and a cutting apparatus that cuts the plurality of plate-like parts from the plate-like member based on the cutting pattern computed by the computing apparatus. The computing apparatus divides an area of plate-like parts to be arranged in the plate-like member into a plurality of areas in accordance with the type of the plate-like parts that form the shoe last, and determines positions of the plurality of plate-like parts to be arranged in each of the areas based on an arrangement condition and generates the cutting pattern.

A cutting pattern generation method according to one aspect of the present disclosure is a method of generating a cutting pattern for cutting a plurality of plate-like parts that form a shoe last from a plate-like member. The cutting pattern generation method includes receiving shoe last data, generating the cutting pattern for cutting the plurality of plate-like parts from the plate-like member having a predetermined size based on the received shoe last data and a shape of the plurality of plate-like parts stored in a storage unit, and outputting the computed cutting pattern. The generating the cutting pattern includes dividing an area of plate-like parts to be arranged in the plate-like member into a plurality of areas in accordance with a type of the plate-like parts that form the shoe last and determining positions of the plurality of plate-like parts to be arranged in each of the areas based on an arrangement condition.

The foregoing and other objects, features, aspects and advantages of the present invention will become more apparent from the following detailed description of the present invention when taken in conjunction with the accompanying drawings.

3

Figure 9A:
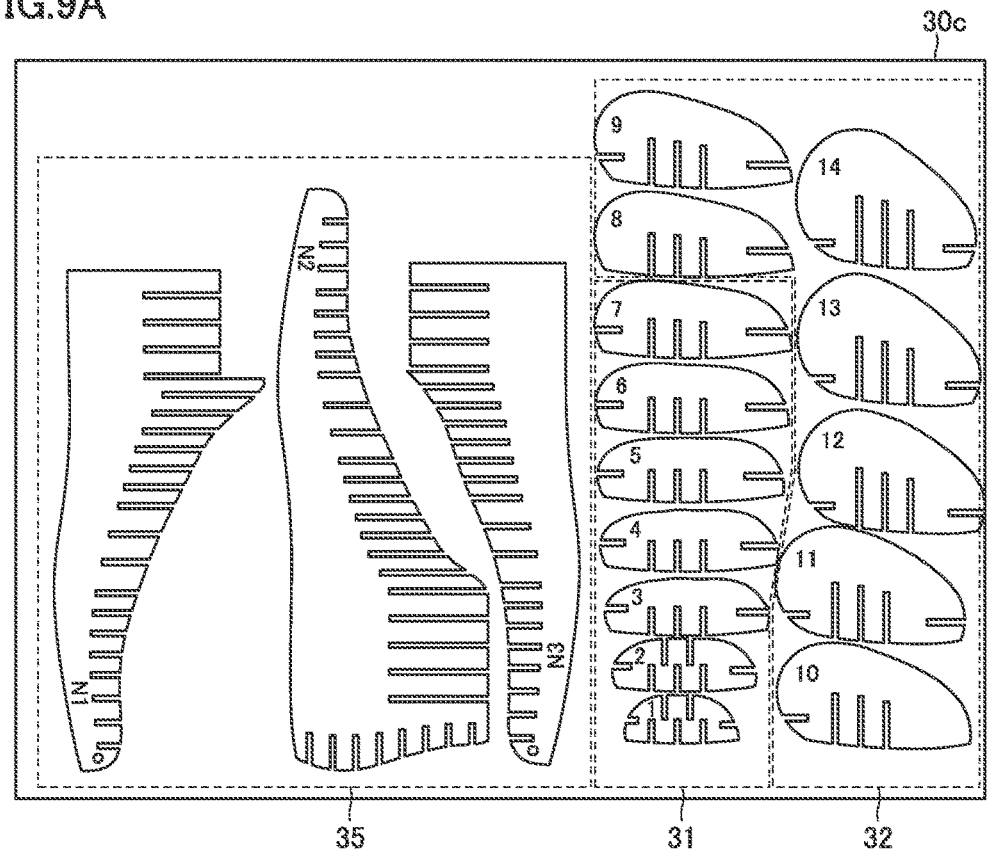
Figure 9B:
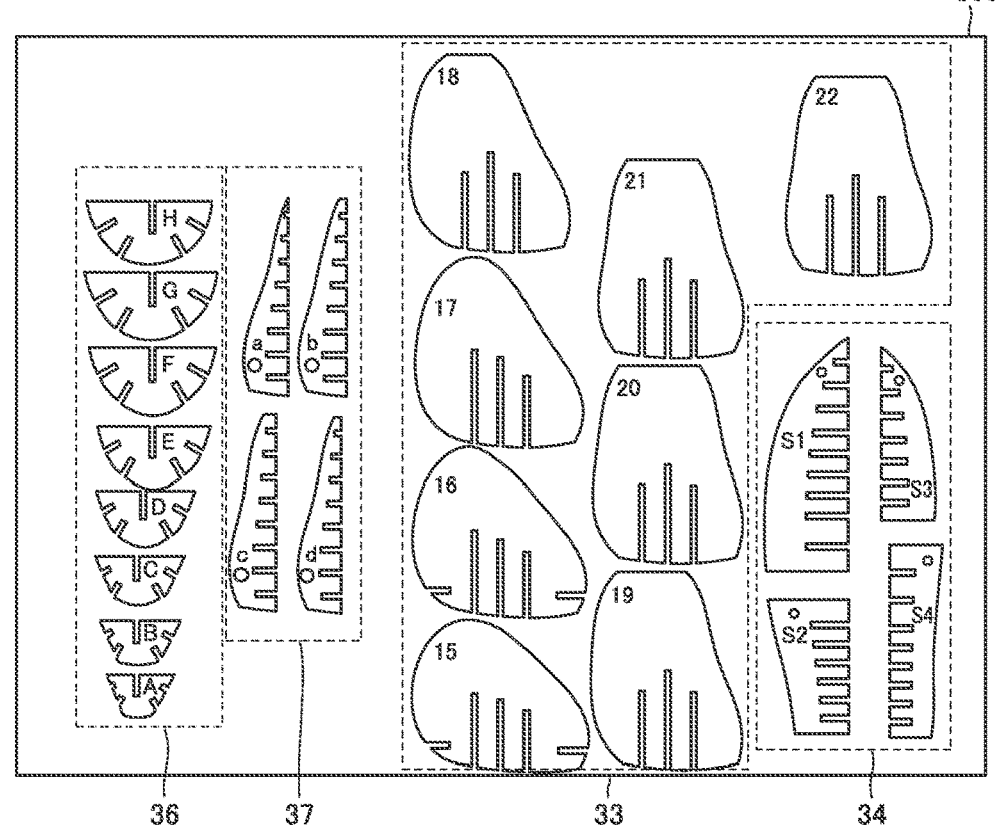

FIGS. 9A and 9B are each a plan view of a cutting pattern according to a modification of the first embodiment.

Figure 10:
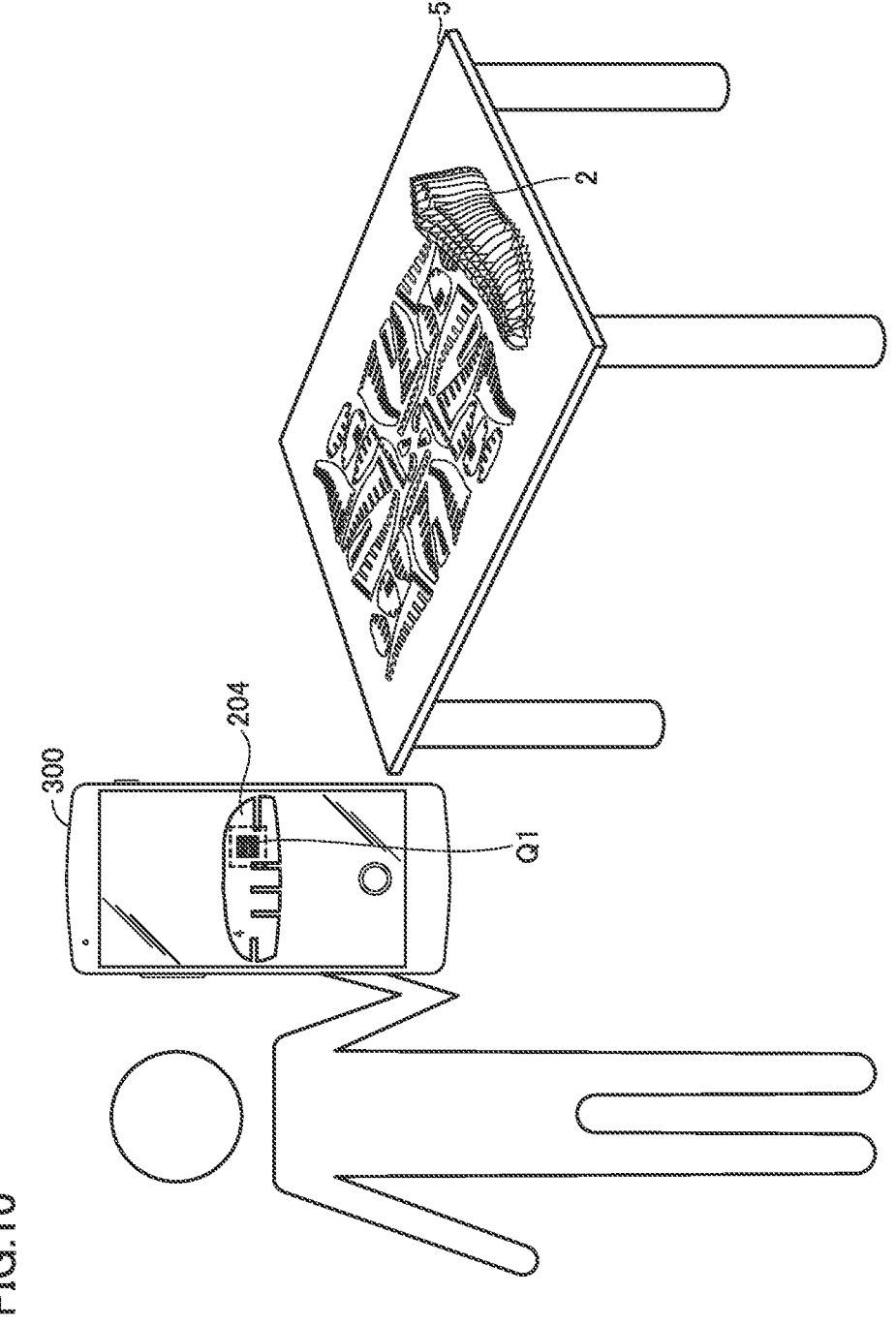

FIG. 10 is a diagram showing overview of assembly support with the use of a cutting pattern according to a second embodiment.

Figure 11:
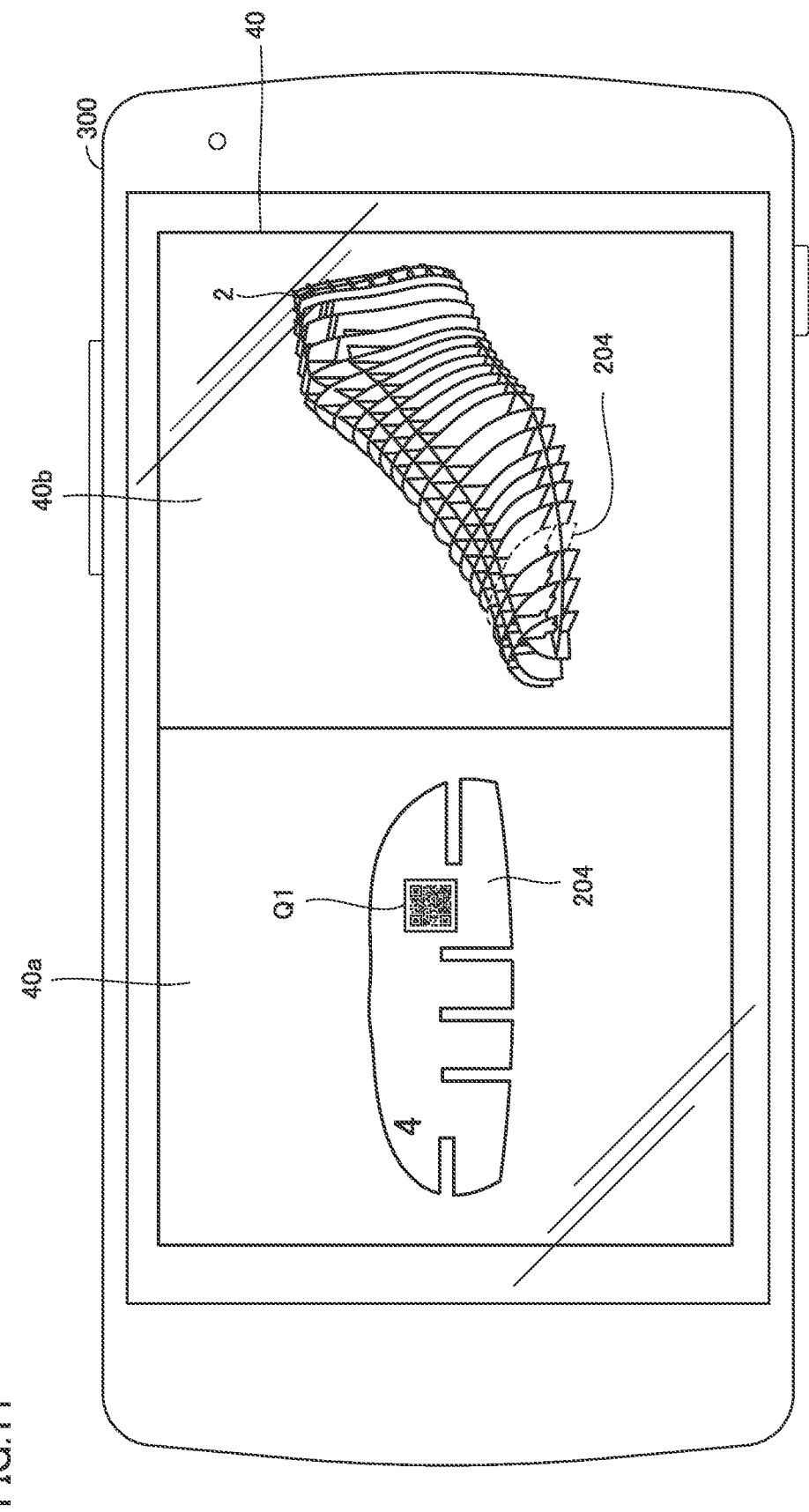

FIG. 11 is a diagram showing exemplary representation shown on a display unit in assembly support according to the second embodiment.

DESCRIPTION OF THE PREFERRED EMBODIMENTS

An embodiment will be described below with reference to the drawings. In the description below, the same elements have the same reference characters allotted and their labels and functions are also the same. Therefore, detailed description thereof will not be repeated.

First Embodiment

[System Configuration]

In a first embodiment, an example of application of the present invention will be described. When manufacturing a custom-made shoe tailored to a foot of a user at, for example, a store, a shoe last should be made based on shoe last data generated based on foot shape data obtained by measuring a foot shape using a measuring apparatus. In particular, in making a shoe last at a store, for such reasons as restriction on facilities and an experience of making of a shoe last by a user, a method of making a shoe last by assembling a plurality of plate-like parts has been adopted. Therefore, a plurality of plate-like parts should be cut from a wooden board such as a medium-density fiberboard (MDF).

In the first embodiment, a cutting support apparatus generates a cutting pattern for cutting a plurality of plate-like parts from a wooden board. Thereafter, in the first embodiment, a cutting apparatus cuts a plurality of plate-like parts from the wooden board based on the cutting pattern generated by the cutting support apparatus. In the first embodiment, a cutting system that performs such a series of processing and makes a plurality of plate-like parts necessary for making a shoe last will be described.

In the first embodiment, an engagement groove is provided in each of a plurality of plate-like parts and a shoe last can be made by attaching each plate-like part to the engagement groove. A wooden board will be described below as an exemplary plate-like member from which a plurality of plate-like parts are cut. The wooden board is not limited to the MDF but another wooden board such as an insulation fiberboard (IB) or a hard fiberboard (HB) may be applicable. Among IBs, an A-class insulation board, a tatami board, or a sheathing board may be employed as a material for a plate-like part. Among HBs, a standard hardboard or a tempered hardboard may be employed as a material for a plate-like part. The material for the plate-like part is not limited to the wooden board as described above, and a highly recyclable corrugated cardboard or a material suitable for a plate-like part such as a cork, a metal, or a thermoplastic resin may be applicable.

Figure 1:
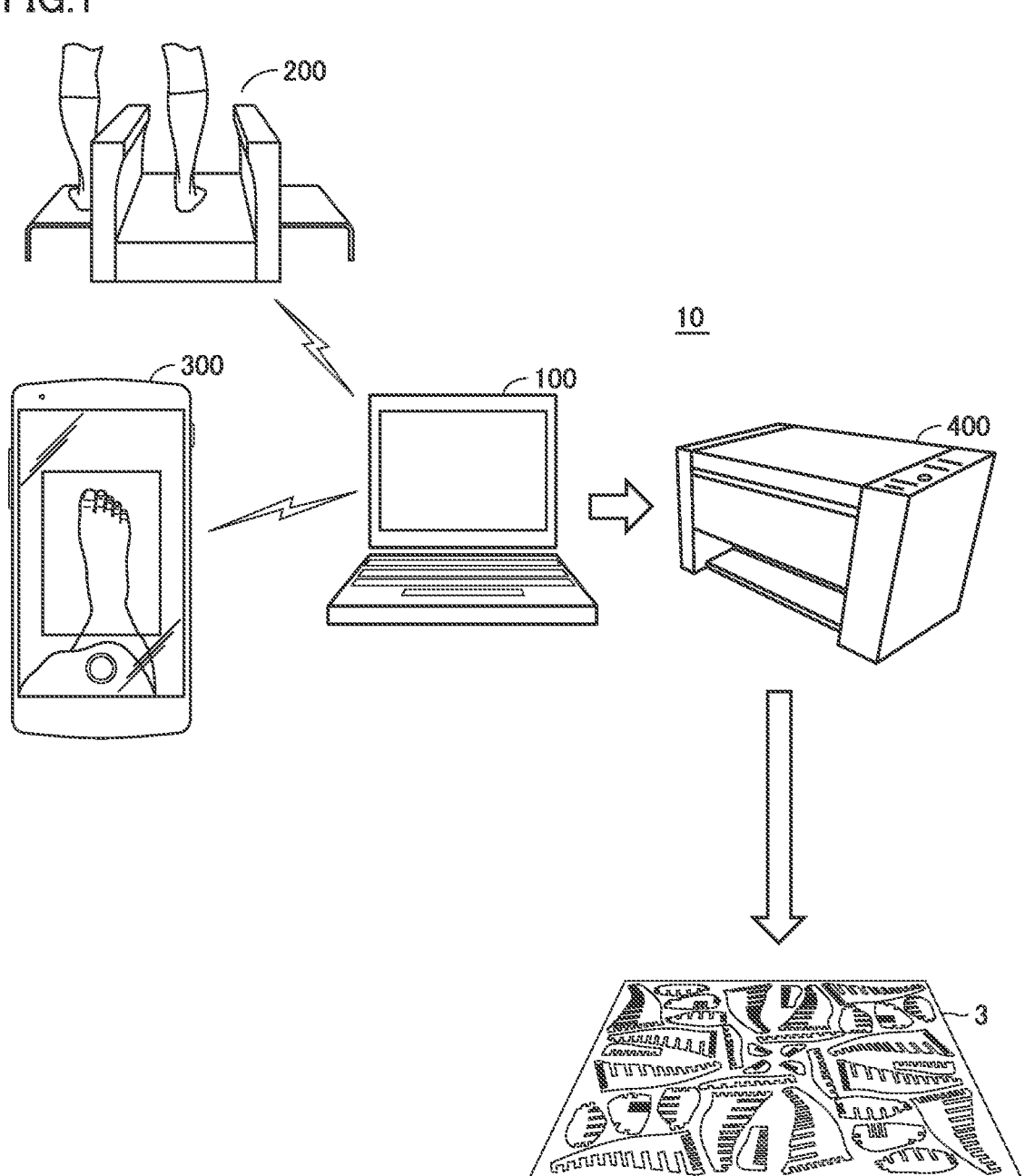
FIG. 1 is a schematic view showing a configuration example of a cutting system according to a first embodiment.

FIG. 1 is a schematic view showing a configuration example of a cutting system 10 according to the first embodiment. Referring to FIG. 1, the cutting system 10 includes a cutting support apparatus 100, a measuring apparatus 200 that measures a foot shape, and a cutting apparatus 400 that cuts a wooden board based on a cutting pattern. Although the cutting system 10 shown in FIG. 1 includes the measuring apparatus 200, the cutting system 10 may use pre-stored shoe last data without including the measuring apparatus 200. In addition, depending on stores, or at a remote location such as a user's house, the foot shape may be measured using a mobile terminal 300 such as a smartphone, instead of the measuring apparatus 200. Furthermore, the cutting support apparatus 100 can communicate with a not-shown data server placed inside or outside a store.

Figure 2:
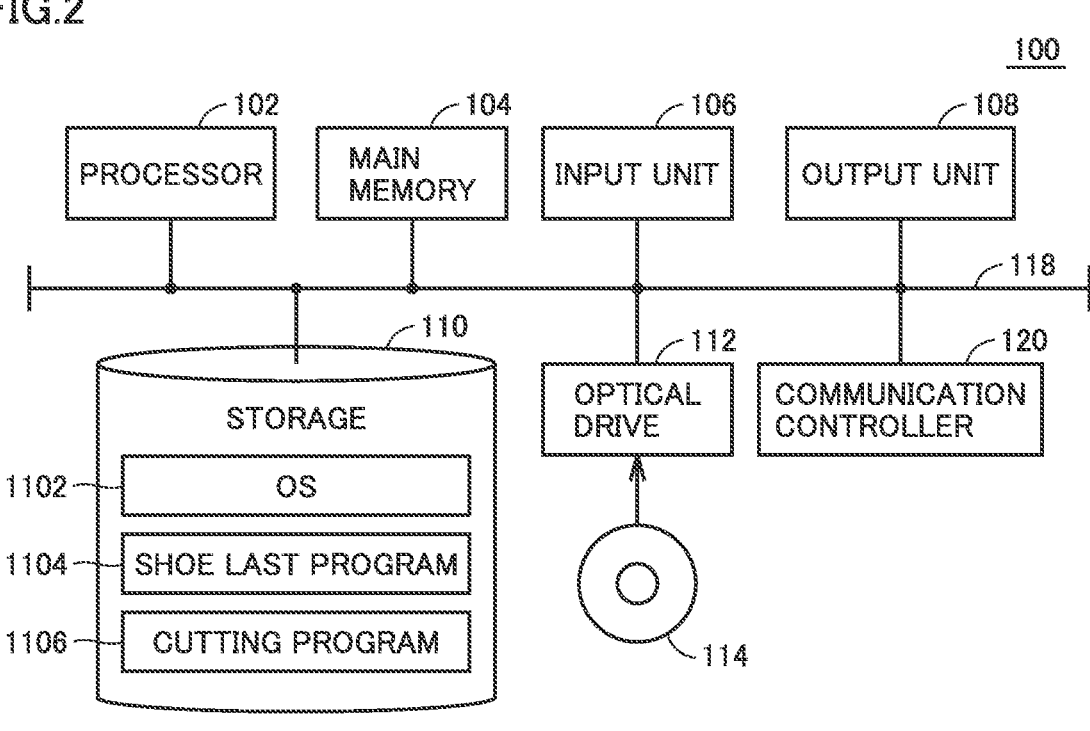
FIG. 2 is a schematic view showing a hardware configuration example of a cutting support apparatus according to the first embodiment.

The cutting support apparatus 100 generates shoe last data based on foot shape data obtained from the measuring apparatus 200 or the mobile terminal 300, and further, generates a cutting pattern of a plurality of plate-like parts based on the shoe last data. When shoe last data stored in advance is used, the cutting support apparatus 100 may generate only a cutting pattern without generating shoe last data. FIG. 2 is a schematic view showing a hardware configuration example of the cutting support apparatus 100 according to the first embodiment. Referring to FIG. 2, the cutting support apparatus 100 includes a processor 102, a main memory 104, an input unit 106, an output unit 108, a storage 110, an optical drive 112, and a communication controller 120. These components are connected through a processor bus 118.

The processor 102 is implemented by a CPU, a GPU or the like, and can read programs (by way of example, an OS 1102 and a shoe last program 1104) stored in the storage 110 and deploy the programs in the main memory 104 for execution. The processor 102 executes various programs read from the storage 110. Specifically, the shoe last program 1104 computes the shoe last data from the foot shape data and additional information received by the input unit 106, based on a prescribed algorithm. Using a prescribed algorithm, a cutting program 1106 generates the cutting pattern of the plurality of plate-like parts based on the shoe last data. For example, the cutting program 1106 includes an algorithm for applying a bounding box to each of individual plate-like parts and laying the plurality of plate-like parts over the wooden board in accordance with an arrangement condition. The processor 102 that executes the programs corresponds to a computing unit of the cutting support apparatus 100.

The main memory 104 is implemented by, for example, a volatile storage device such as a DRAM or an SRAM. The storage 110 is implemented by, for example, a non-volatile storage device such as an HDD or an SSD.

In addition to the OS 1102 for implementing a basic function, the shoe last program 1104 and the cutting program 1106 for providing a function as the cutting support apparatus 100 are stored in the storage 110. Information on a shape and a type of the plurality of plate-like parts and an order of assembly of the plurality of plate-like parts is further stored in the storage 110.

The input unit 106 includes an input interface connected to the measuring apparatus 200 or the mobile terminal 300 to receive the foot shape data from the measuring apparatus 200 or the mobile terminal 300. The input unit 106 is implemented by a keyboard, a mouse, a microphone, a touch device or the like, and can further receive the information selected by the user.

The output unit 108 includes an output interface that outputs the cutting pattern of the plurality of plate-like parts calculated by the processor 102 to the cutting apparatus 400. The output unit 108 is implemented by a display, various indicators, a printer or the like, and outputs a processing result or the like from the processor 102.

The communication controller 120 exchanges data with another control device or the like by using wired or wireless communication. The cutting support apparatus 100 may exchange the foot shape data and the additional information with the measuring apparatus 200 or the mobile terminal 300 through the communication controller 120, and may exchange the cutting pattern with the cutting apparatus 400 through the communication controller 120. In addition to the communication controller 120, a USB controller connected to the processor bus 118 may be provided to exchange the data with another control device or the like through USB connection.

The cutting support apparatus 100 includes the optical drive 112 that may read a computer-readable program stored in a recording medium 114 (e.g., optical recording medium such as a digital versatile disc (DVD)) in a non-transitory manner, and install the program in the storage 110 or the like.

Although the cutting program 1106 and the like executed in the cutting support apparatus 100 may be installed through the computer-readable recording medium 114, the cutting program 1106 and the like may be installed by being downloaded from a server device or the like on a network. In addition, the functions provided by the cutting support apparatus 100 according to the embodiment may be implemented by using a part of a module provided by the OS.

Although FIG. 2 shows the configuration example in which the processor 102 executes the programs to thereby provide the functions required as the cutting support apparatus 100, a part or all of these provided functions may be implemented by using a dedicated hardware circuit (such as, for example, an ASIC or an FPGA). The configuration of the cutting support apparatus 100 shown in FIG. 2 is illustrative and the present disclosure is not limited to this configuration.

The measuring apparatus 200 is implemented by a three-dimensional foot shape scanner using laser measurement. A laser measurement apparatus that is built into walls provided on both sides of a foot put on a top board measures the foot while moving from a toe to a heel of the foot, thereby obtaining three-dimensional foot shape data of the user. A measurement method or the like of the measuring apparatus 200 is not particularly limited, as long as it can measure the three-dimensional foot shape data. The mobile terminal 300 such as a smartphone may also be used to capture an image of the foot of the user and obtain image data of the foot, and the foot shape data may be generated from the obtained image data of the foot through preliminarily installed software.

The cutting apparatus 400 is, for example, an apparatus that cuts a plurality of plate-like parts from a plate-like wooden board with laser beams based on a cutting pattern. When a new plate-like wooden board is set in the cutting apparatus 400, the cutting apparatus 400 outputs a wooden board 3 in which a plurality of plate-like parts are cut based on the cutting pattern. A method of cutting is not limited to laser beams, and the plate-like wooden board may be cut with a metal blade or a water pressure.

[Cutting Pattern]

Figure 3:
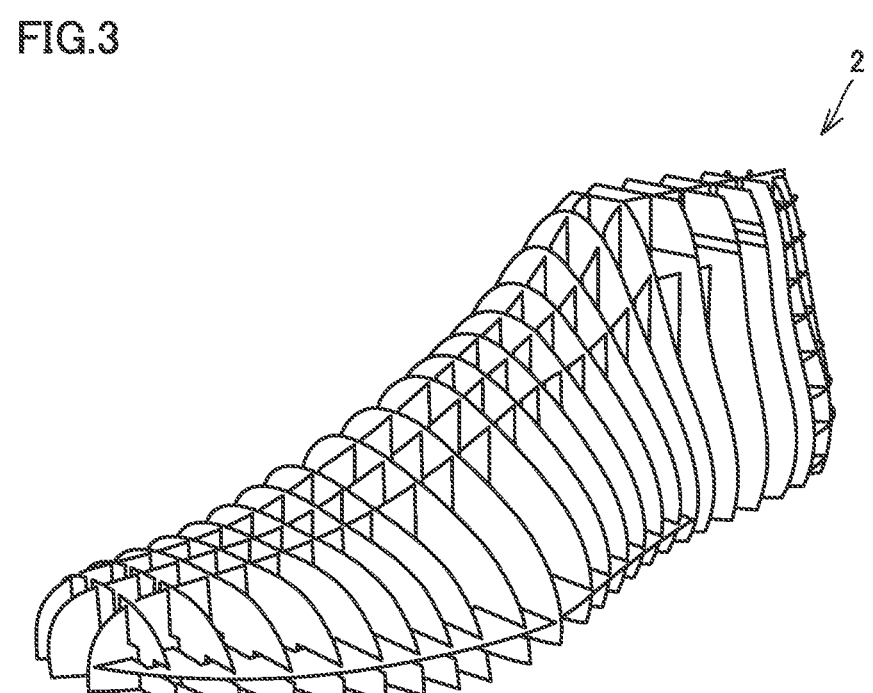
FIG. 3 is a perspective view of a shoe last according to the first embodiment.

FIG. 3 is a perspective view of the shoe last 2 according to the first embodiment. The shoe last 2 shown in FIG. 3 is made by assembling a plurality of plate-like parts cut from a wooden board. An engagement groove is provided in each of the plate-like parts and the shoe last 2 can be assembled by attaching each plate-like part to the engagement groove.

In making a standard shoe last 2, the shoe last 2 for one foot can be made of two wooden boards each having a size of 300 mm×450 mm Forty-one plate-like parts are cut from the two wooden boards. The cutting support apparatus 100 generates a cutting pattern generally by laying forty-one plate-like parts over the wooden board for cutting forty-one plate-like parts from the two wooden boards with material loss being reduced.

When the cutting pattern is unconditionally generated, however, the cutting pattern in which the plate-like parts are arranged irrespectively of positions thereof in the shoe last 2 is generated. When the plurality of plate-like parts are cut based on this cutting pattern, assembly of the shoe last 2 from the plurality of cut plate-like parts becomes difficult. In particular, in order to have a user experience making of the shoe last 2, the cutting support apparatus 100 should create the cutting pattern in consideration of ease in assembly. The size of the wooden board and the number of plate-like parts are by way of example, and limitation to those values is not intended.

The cutting support apparatus 100 divides an area of plate-like parts to be arranged in a wooden board into a plurality of areas in accordance with a type of the plate-like parts that form the shoe last 2, and determines positions of the plurality of plate-like parts to be arranged in each of the areas and generates a cutting pattern. The plate-like parts that form the shoe last 2 can broadly be divided into such types as a "toe part," an "instep part," an "ankle part," a "malleolus part," a "foot length part," a "heel height part," and a "circumferential heel part." The division above is by way of example, and the "toe part," the "instep part," and the "ankle part" may collectively be defined as a "foot width direction part," and the "malleolus part" may be divided into a "medial malleolus part" and a "lateral malleolus part."

The cutting support apparatus 100 thus generates a cutting pattern with an area being divided into areas in accordance with the type of the plate-like parts, so that a plurality of plate-like parts are cut collectively for each type of the plate-like parts in cutting of the wooden board based on the cutting pattern. Since a plurality of plate-like parts close in position to each other in the shoe last 2 are collectively cut, assembly of the shoe last 2 is facilitated.

Figure 4:
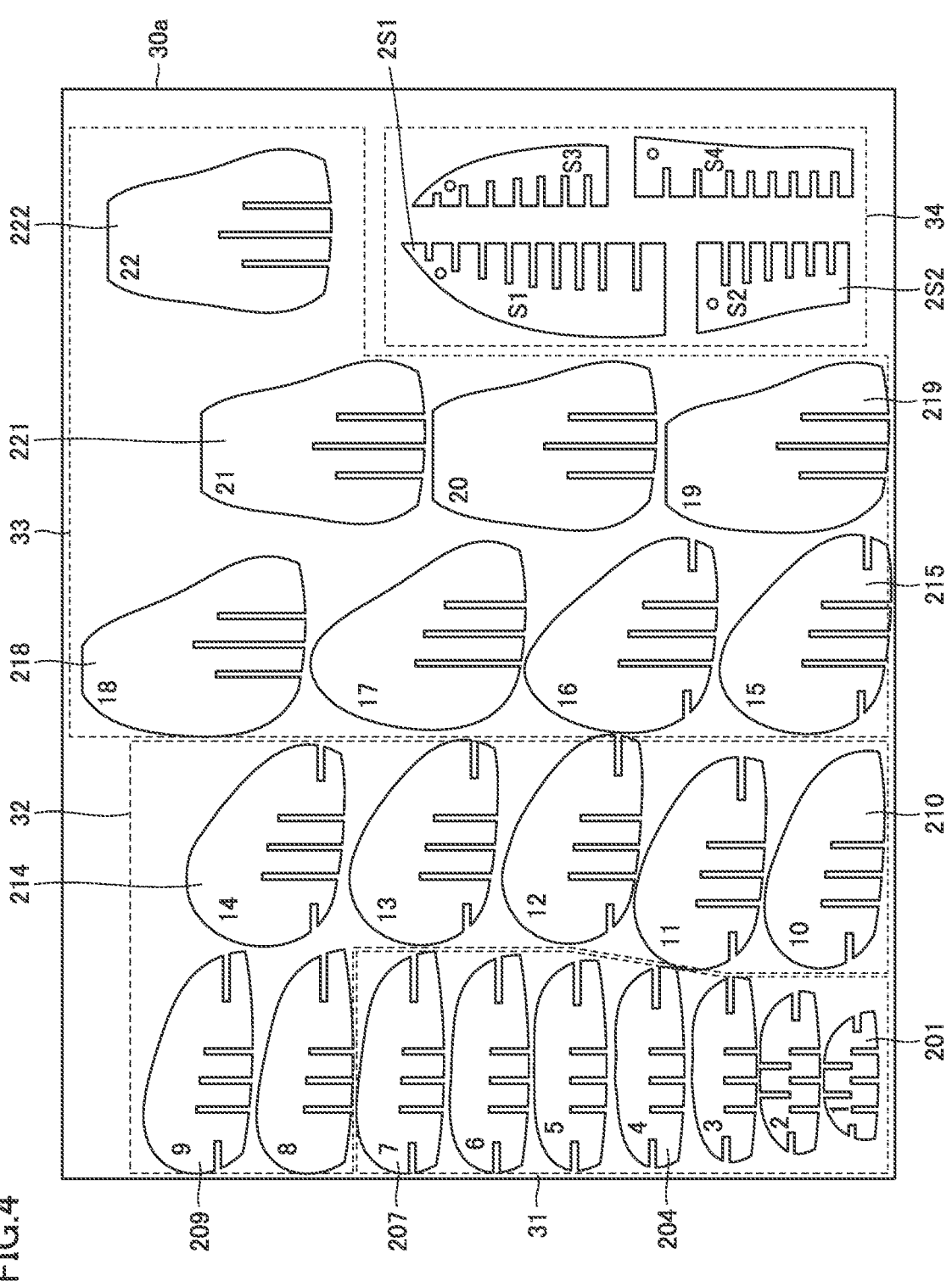
FIG. 4 is a plan view of a first cutting pattern according to the first embodiment.

Specifically, a cutting pattern generated by the cutting support apparatus 100 will be described. Initially, the cutting support apparatus 100 allocates an area where the "toe part," the "instep part," the "ankle part," and the "malleolus part" are to be arranged to a first cutting pattern. FIG. 4 is a plan view of a first cutting pattern 30a according to the first embodiment. In the cutting pattern 30a shown in FIG. 4, from the left in the figure, an area 31 for the "toe part," an area 32 for the "instep part," an area 33 for the "ankle part," and an area 34 for the "malleolus part" are allocated in this order.

Furthermore, the cutting support apparatus 100 determines positions of the plurality of plate-like parts in each area based on an arrangement condition. The arrangement condition includes a condition of alignment of the plurality of plate-like parts in the order of assembly and a condition of minimization of an area of each area where the plurality of plate-like parts are arranged. In other words, while the cutting support apparatus 100 aligns the plurality of plate-like parts to be arranged in each area in the order of assembly, it lays the plate-like parts to minimize the area of each area and computes the cutting pattern 30a. The arrangement condition is not limited to the condition above. Any one of the condition of alignment of the plurality of plate-like parts in the order of assembly and the condition of minimization of the area of each area where the plurality of plate-like parts are arranged may be applicable, or an another condition may further be added. For example, a condition of minimization of a time period for cutting a plurality of plate-like parts to be arranged in each area or a condition that orientations of a plurality of plate-like parts to be arranged in each area are identical may be added. Specifically, when the condition of minimization of the time period for cutting is added, the cutting support apparatus 100 generates a cutting pattern where a plurality of plate-like parts are arranged to reduce a distance of movement of a cutting portion (a portion from which laser beams are emitted) of the cutting apparatus 400 that cuts a wooden board.

In the cutting pattern 30a shown in FIG. 4, for example, the order from a toe side is adopted as the condition of alignment of the plurality of plate-like parts in the order of assembly. Therefore, as shown in FIG. 4, plate-like parts (toe parts) within the area 31 are laid in the order from the toe side from a position on a lower side of the figure. Similarly, plate-like parts (instep parts) within the area 32 are laid in the order from the toe side subsequently to the area 31, and plate-like parts (ankle parts) within the area 33 are laid in the order from the toe side subsequently to the area 32.

Plate-like parts as the "foot width direction parts" including the "toe parts," the "instep parts," and the "ankle parts" are provided with serial numbers from 1 to 22 as identification information. FIG. 4 shows a plate-like part 201 as a first plate-like part and a plate-like part 204 as a fourth plate-like part. Though reference characters are not provided to all plate-like parts in FIG. 4 for avoiding complexity of the figure, an nth plate-like part is assumed to be labeled as a plate-like part 2n.

Plate-like parts (malleolus parts) within the area 34 are laid in the order from the toe side from a position on an upper side in the figure. The plate-like parts as the "malleolus parts" are provided with serial numbers from S1 to S4 as identification information. The plate-like parts S1 and S2 are plate-like parts as the "lateral malleolus parts" and the plate-like parts S3 and S4 are plate-like parts as the "medial malleolus parts." FIG. 4 shows a plate-like part 2S1 as an S1st plate-like part and a plate-like part 2S2 as an S2nd plate-like part. Though reference characters are not provided to all plate-like parts in FIG. 4 for avoiding complexity of the figure, an Sn-th plate-like part is assumed to be labeled as a plate-like part 2Sn.

Figure 5A:
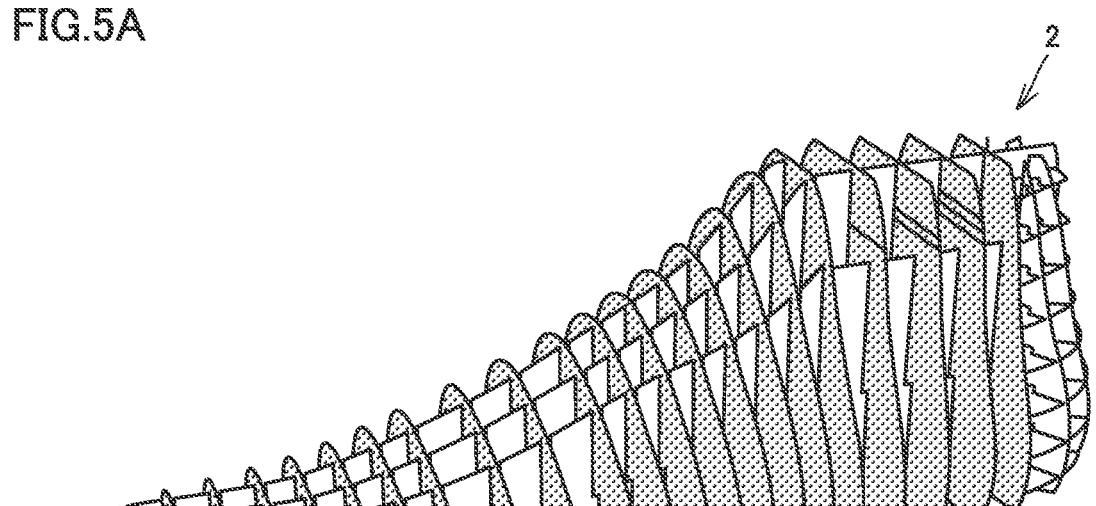
FIGS. 5A and 5B are each a diagram showing a position in a shoe last, of a plate-like part arranged in the cutting pattern shown in FIG. 4.
Figure 5B:
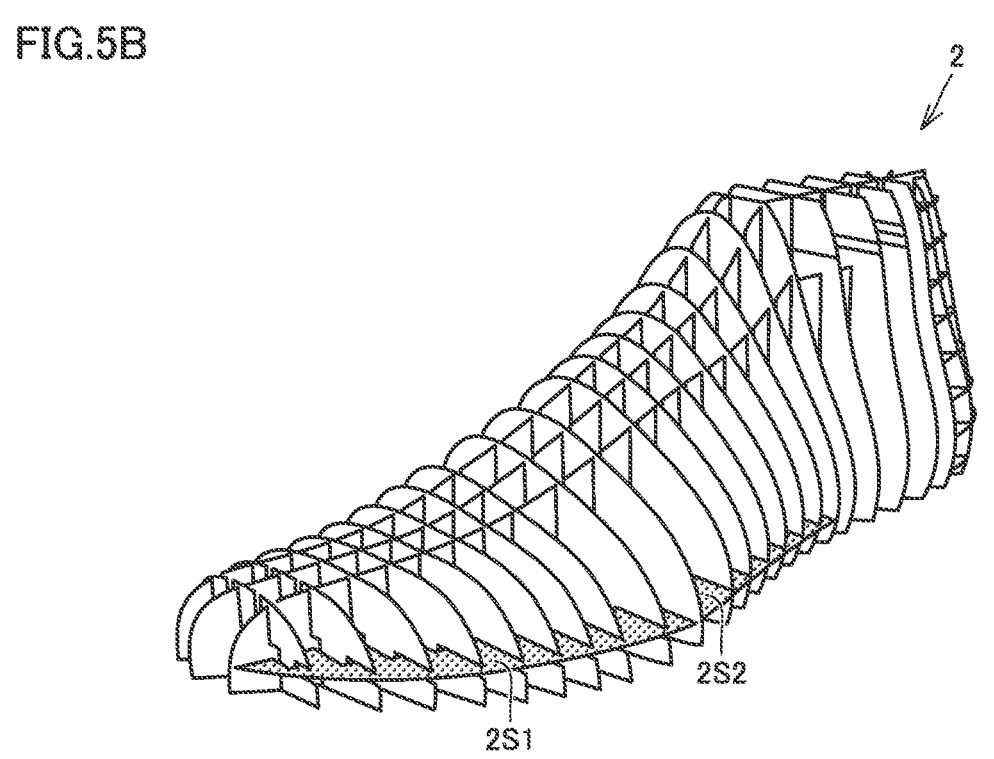

FIGS. 5A and 5B are each a diagram showing a position in the shoe last 2, of a plate-like part arranged in the cutting pattern 30a shown in FIG. 4. FIG. 5A shows positions in the shoe last 2, of the plate-like parts as the "foot width direction parts" including the "toe parts," the "instep parts," and the "ankle parts," with those plate-like parts being hatched. Specifically, the "foot width direction parts" from the first plate-like part 201 to the twenty-second plate-like parts 222 are hatched.

FIG. 5B shows positions in the shoe last 2, of the plate-like parts as the "malleolus parts," with those plate-like parts being hatched. Specifically, the "malleolus parts" from the S1st plate-like part 2S1 to an S4th plate-like part 2S4 are hatched. FIG. 5B shows only the S1st plate-like part 2S1 and the S2nd plate-like part 2S2 as the plate-like parts.

Figure 6:
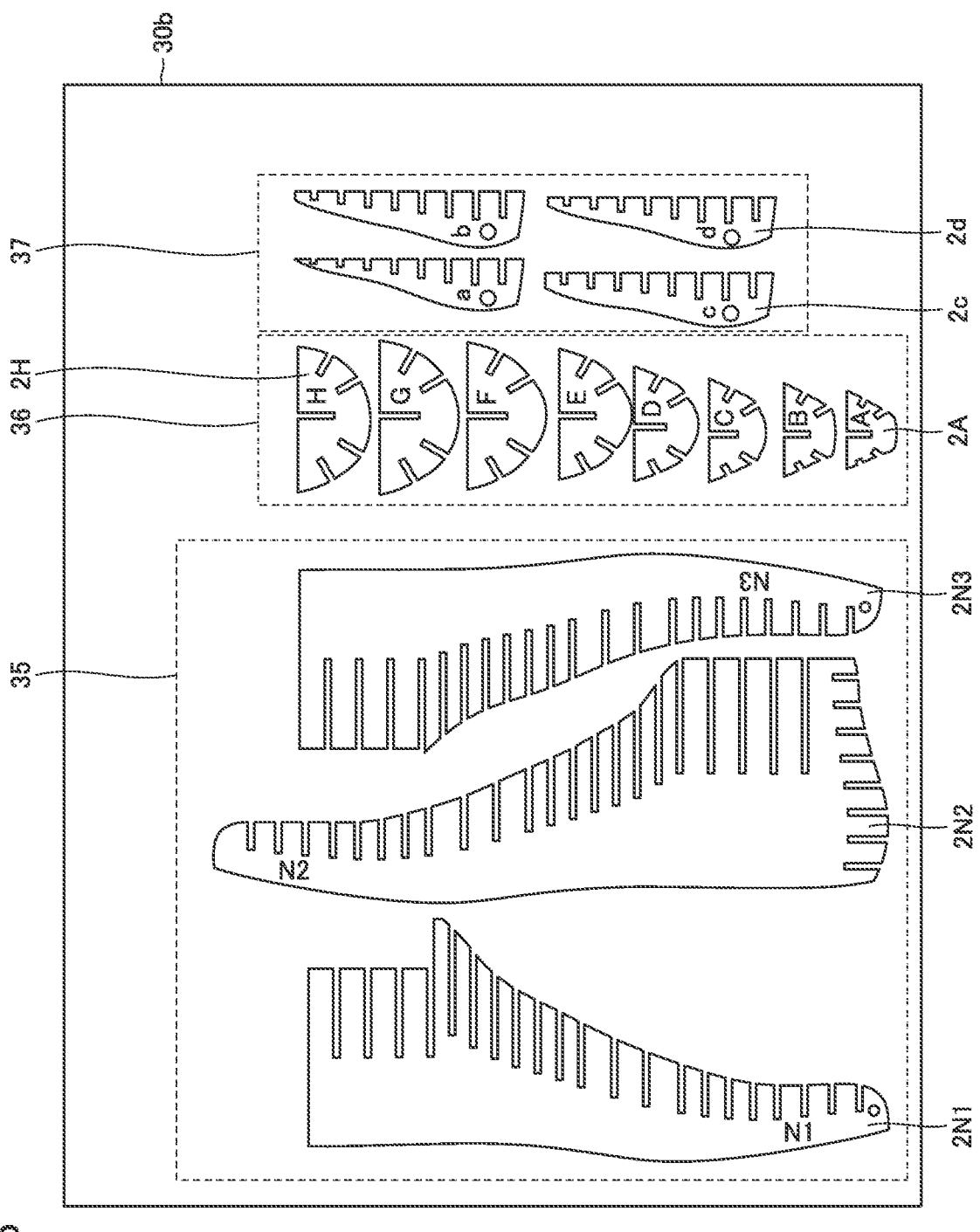
FIG. 6 is a plan view of a second cutting pattern according to the first embodiment.

Then, the cutting support apparatus 100 allocates an area where the "foot length parts," the "heel height parts," and the "circumferential heel parts" are to be arranged to a second cutting pattern. FIG. 6 is a plan view of a second cutting pattern 30b according to the first embodiment. In the cutting pattern 30b shown in FIG. 6, from the left in the figure, an area 35 for the "foot length parts," an area 36 for the "heel height parts," and an area 37 for the "circumferential heel parts" are allocated in this order.

The cutting support apparatus 100 determines positions of the plurality of plate-like parts in each area based on an arrangement condition. For example, when the order of assembly of the plate-like parts as the "foot length parts" is set to the order from an outer side, as shown in FIG. 6, the plate-like parts (foot length parts) within the area 35 are laid in the order from the outer side from a position on the left in the figure. When the order of assembly of the plate-like parts as the "heel height parts" is set to the order from an ankle side, as shown in FIG. 6, the plate-like parts (heel height parts) within the area 36 are laid in the order from the ankle side from a position on a lower side in the figure. When the order of assembly of the plate-like parts as the "circumferential heel parts" is set to the order from the outer side, as shown in FIG. 6, the plate-like parts (circumferential heel parts) within the area 37 are laid in the order from the outer side from a position on an upper left side in the figure.

The plate-like parts as the "foot length parts" are provided with serial numbers from N1 to N3 as the identification information. FIG. 6 shows a plate-like part 2N1 as an N1st plate-like part, a plate-like part 2N2 as an N2nd plate-like part, and a plate-like part 2N3 as an N3rd plate-like part.

The plate-like parts as the "heel height parts" are provided with signs A to H as the identification information. FIG. 6 shows a plate-like part 2A as the plate-like part with the sign A and shows a plate-like part 2H as the plate-like part with the sign H. The plate-like parts as the "circumferential heel parts" are provided with signs a to d as the identification information. FIG. 6 shows a plate-like part 2c as the plate-like part with the sign c and shows a plate-like part 2d as the plate-like part with the sign d. Though reference characters are not provided to all plate-like parts in FIG. 6 for avoiding complexity of the figure, a plate-like part with a sign is assumed to be labeled as a plate-like part 2+ sign.

Figure 7A:
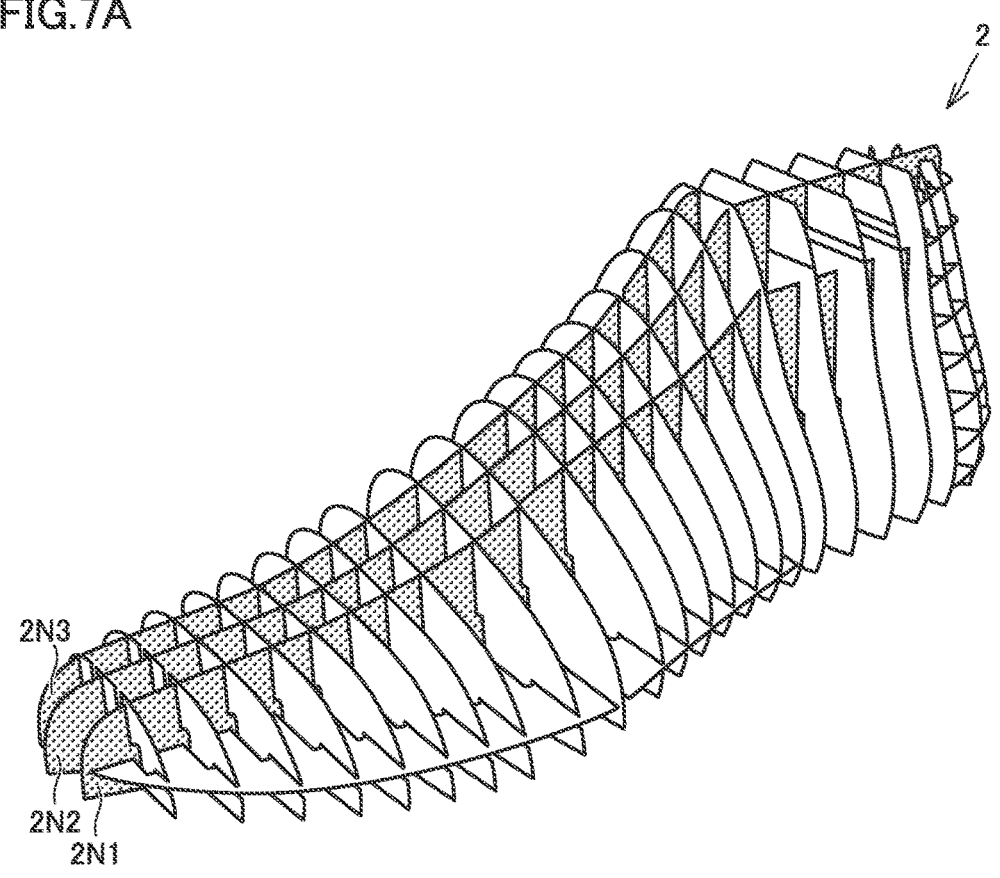
FIGS. 7A and 7B are each a diagram showing a position in the shoe last, of a plate-like part arranged in the cutting pattern shown in FIG. 6.
Figure 7B:
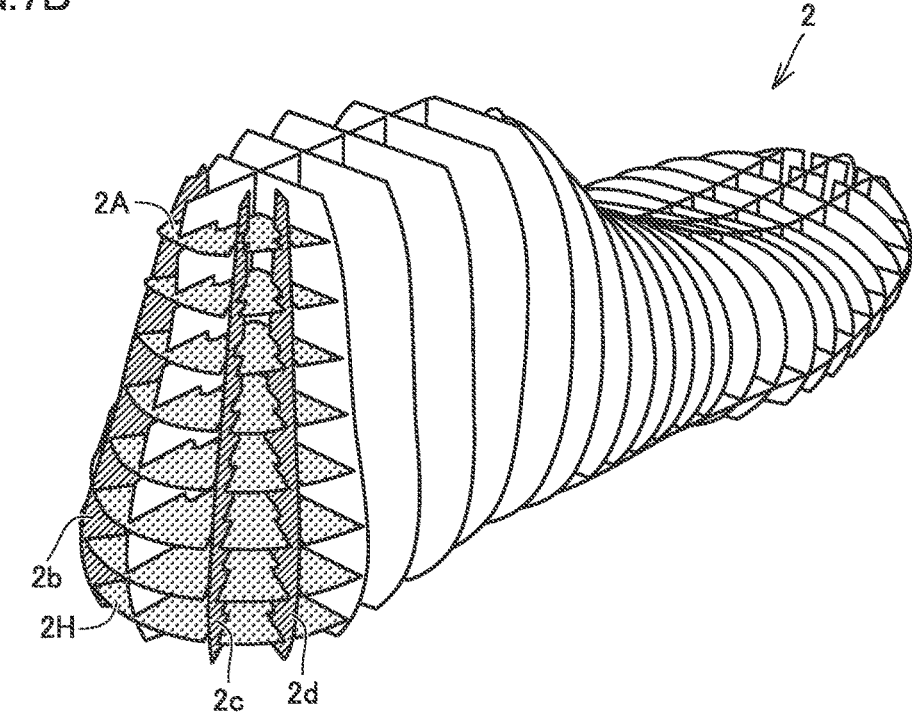

FIGS. 7A and 7B each show a position in the shoe last 2, of a plate-like part arranged in the cutting pattern 30b shown in FIG. 6. FIG. 7A shows positions in the shoe last 2, of the plate-like parts as the "foot length parts," with those plate-like parts being hatched. Specifically, the "foot length parts" from the N1st plate-like part 2N1 to the N3rd plate-like part 2N3 are hatched.

FIG. 7B shows positions in the shoe last 2, of the plate-like parts as the "heel height parts" and the "circumferential heel parts," with those plate-like parts being hatched. Specifically, the "heel height parts" from the plate-like part 2A with the sign A to the plate-like part 2H with the sign H are hatched, and the "circumferential heel parts" from the plate-like part 2a with the sign a to the plate-like part 2d with the sign d are hatched. FIG. 7B does not show the plate-like part 2a with the sign a.

The identification information shown in FIGS. 4 and 6 is outputted to the cutting apparatus 400 as a part of the cutting pattern. The cutting apparatus 400 writes the identification information included in the cutting pattern into a surface of the wooden board with laser beams. The cutting support apparatus 100 provides the identification information to each of the plurality of plate-like parts based on the order of assembly thereof as above. Rather than providing plate-like parts with a different type of identification information for each area as above, identification information of the same type (for example, first to forty-first) may be provided to plate-like parts throughout all areas. The cutting support apparatus 100 may provide a plurality of plate-like parts with the identification information such that orientations of the identification information are identical after assembly of the plurality of plate-like parts. Specifically, the identification information in the same orientation is provided, like serial numbers from 1 to 22 provided to the plate-like parts as the "foot width direction parts" shown in FIG. 4. The identification information is thus readily visually recognized also after assembly of a plurality of plate-like parts.

[Cutting Pattern Generation Method]

Figure 8:
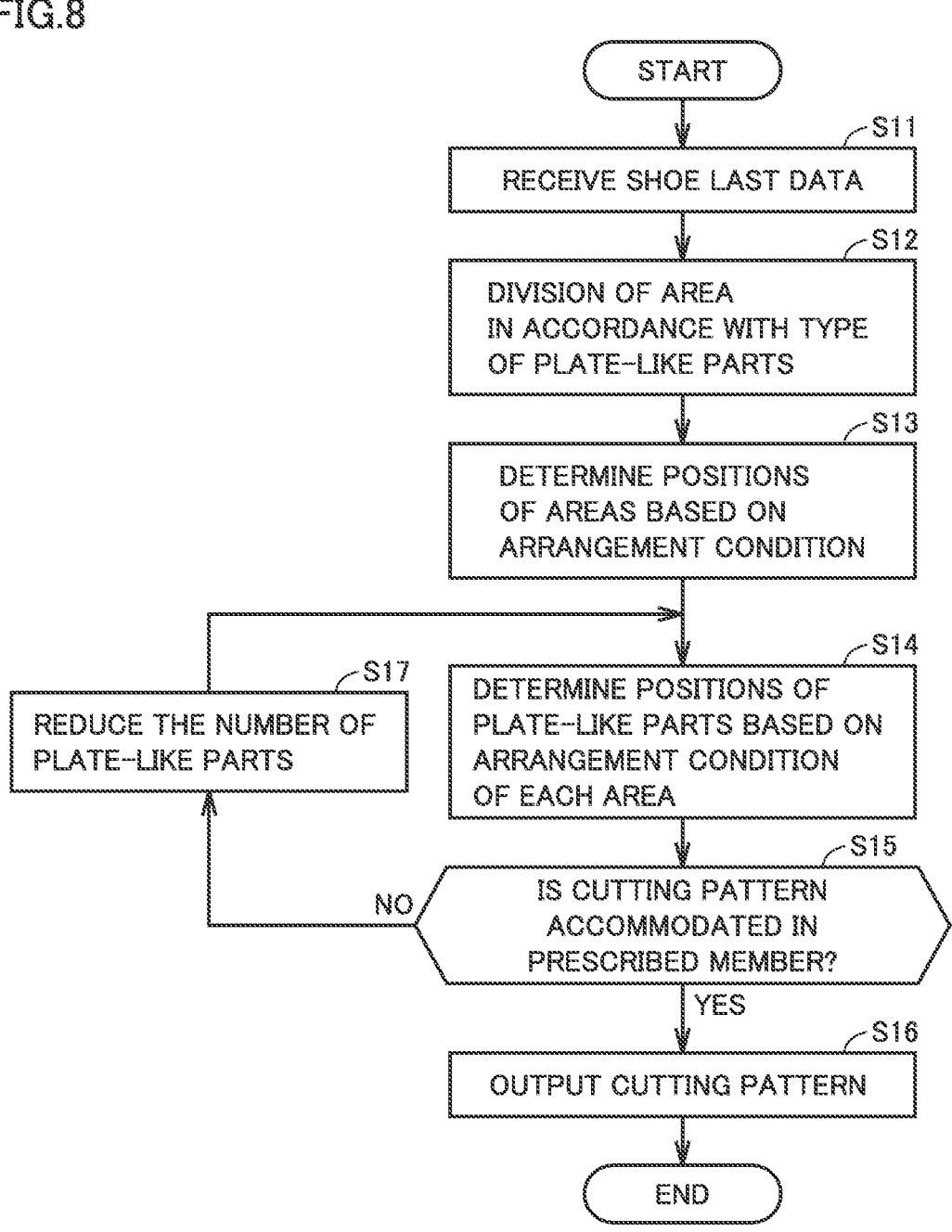
FIG. 8 is a flowchart for illustrating a method of creating a cutting pattern of plate-like parts in the cutting support apparatus according to the first embodiment.

Processing for creating a cutting pattern of a plate-like part in the cutting support apparatus 100 will further be described in detail. FIG. 8 is a flowchart for illustrating a method of creating a cutting pattern of a plate-like part in the cutting support apparatus 100 according to the embodiment. Initially, the cutting support apparatus 100 receives shoe last data computed from foot shape data obtained by measurement by the measuring apparatus 200 or the mobile terminal 300 (step S11). For a custom-made shoe, the cutting support apparatus 100 receives shoe last data computed from the foot shape data obtained by measurement. For a ready-made shoe, however, the cutting support apparatus 100 may receive existing shoe last data.

The cutting support apparatus 100 divides an area of plate-like parts to be arranged in the wooden board in accordance with the type of the plate-like parts (step S12). As shown in FIGS. 4 and 6, the cutting support apparatus 100 divides the two wooden boards into areas for each of such types as the "toe parts," the "instep parts," the "ankle parts," the "malleolus parts," the "foot length parts," the "heel height parts," and the circumferential heel parts."

The cutting support apparatus 100 determines a position of the area for each type based on the arrangement condition (step S13). A condition the same as the condition for arrangement of the plate-like part is allocated as the condition for arrangement of the area. The condition for arrangement of the area may naturally be different from the condition for arrangement of the plate-like part. Specifically, the arrangement condition includes the condition of alignment of the plurality of areas in the order of assembly and the condition of minimization of an area of the plurality of areas arranged on the wooden board. In other words, while the cutting support apparatus 100 aligns the plurality of areas in the order of assembly, it determines positions of the plurality of areas to minimize the area thereof on the wooden board. The arrangement condition is not limited to the condition above. Any one of the condition of alignment of the plurality of areas in the order of assembly and the condition of minimization of the area of the plurality of areas arranged on the wooden board may be applicable, or yet another condition may be added.

As shown in FIGS. 4 and 6, other than the order from the toe side, the cutting support apparatus 100 may set the order of assembly, for example, to such an order as cutting the "foot length parts" first and then sequentially inserting the "toe parts," the "instep parts," and the "ankle parts" into the "foot length parts." FIGS. 9A and 9B are each a plan view of a cutting pattern according to a modification of the first embodiment. FIG. 9A is a plan view of a first cutting pattern 30c in the modification and FIG. 9B is a plan view of a second cutting pattern 30d in the modification.

In the cutting pattern 30c shown in FIG. 9A, from the left in the figure, the area 35 for the "foot length parts," the area 31 for the "toe parts," and the area 32 for the "instep parts" are allocated in this order. In the cutting pattern 30d shown in FIG. 9B, from the left in the figure, the area 36 for the "heel height parts," the area 37 for the "circumferential heel parts," the area 33 for the "ankle parts," and the area 34 for the "malleolus parts" are allocated in this order.

By providing the "foot length parts" in the first cutting pattern 30c as shown in FIGS. 9A and 9B, the "foot length parts" can be cut first and the "toe parts" and the "instep parts" can sequentially be inserted into the "foot length parts" so that the user can efficiently do works.

Referring back to FIG. 8, the cutting support apparatus 100 determines positions of the plurality of plate-like parts included in each area, a position on the wooden board of which has been determined, based on the arrangement condition (step S14). For example, in the area of the "toe parts" shown in FIG. 4, the cutting support apparatus 100 determines positions of individual plate-like parts by aligning seven plate-like parts in the order from the toe side to minimize the area of that area.

The shape and the size of the plurality of plate-like parts are different depending on a size of a shoe. For example, the shape and the size of a plurality of plate-like parts created based on shoe last data of a shoe having a foot length size of 30 cm is larger than the shape and the size of a plurality of plate-like parts created based on shoe last data of a shoe having a foot length size of 25 cm. For example, all plate-like parts created based on the shoe last data of the shoe having the foot length size of 25 cm are accommodated in two wooden boards. All plate-like parts created based on the shoe last data of the shoe having the foot length size of 30 cm, however, may not be accommodated in two wooden boards.

When all plate-like parts are not accommodated in the two wooden boards, plate-like parts that are not accommodated are arranged in a third wooden board and a cutting pattern is generated. When the number of wooden boards to be used increases, material loss cannot be reduced. The cutting support apparatus 100 determines whether or not the cutting pattern is accommodated in two wooden boards (step S15).

When the cutting pattern is accommodated in the two wooden boards (YES in step S15), the cutting support apparatus 100 outputs the cutting pattern to the cutting apparatus 400 (step S16). The cutting apparatus 400 cuts the wooden board based on the cutting pattern provided from the cutting support apparatus 100 as shown in FIGS. 4 and 6.

When the cutting pattern is not accommodated in the two wooden boards (NO in step S15), the cutting support apparatus 100 reduces the number of plate-like parts that form the shoe last (step S17). For example, when the shoe last is constituted of forty-one plate-like parts, the cutting support apparatus 100 reduces the number of plate-like parts to forty and changes the cutting pattern to accommodate the cutting pattern of the plurality of plate-like parts in two wooden boards.

When the cutting support apparatus 100 reduces the number of the plate-like parts, the cutting support apparatus 100 reduces a plate-like part that has less effect on the shape of the shoe last among the plurality of plate-like parts and generates the cutting pattern. The plate-like part that has less effect on the shape of the shoe last is, for example, a plate-like part small in difference in shape and size from an adjacent plate-like part. In other words, the cutting support apparatus 100 determines that a plate-like part in a portion less in change in shape in the shoe last falls under the plate-like part that has less effect on the shape of the shoe last. The cutting support apparatus 100, for example, reduces the fourth plate-like part 204 among the seven plate-like parts as the "toe parts" so that the "toe parts" are composed of six plate-like parts.

When the cutting support apparatus 100 reduces the number of plate-like parts in step S17, the process returns to step S14 and the cutting support apparatus 100 determines again positions of the plurality of plate-like parts for each area based on the arrangement condition.

Though the cutting support apparatus 100 determines whether or not the cutting pattern is accommodated in two wooden boards, the number of wooden boards is different depending on a size of the wooden board. For example, the cutting pattern would be accommodated in a single wooden board if the wooden board has a size larger than 300 mm×450 mm, and three or more wooden boards would be required if a wooden board has a size smaller than that size. Depending on a size of the shoe last, the cutting pattern may be accommodated in a single wooden board having the same size of 300 mm×450 mm Therefore, in the description above, the cutting support apparatus 100 determines whether or not the cutting pattern is accommodated, for example, based on such setting that two wooden boards each having a size of 300 mm×450 mm are adopted as the prescribed member.

Second Embodiment

[Identification Information for Cutting Pattern]

The cutting support apparatus 100 may provide a cutting pattern with a two-dimensional code other than a number, as the identification information of a plurality of plate-like parts. By providing a two-dimensional code to each of plate-like parts, making of a shoe last can more positively be supported. The cutting apparatus 400 writes a two-dimensional code included in a cutting pattern into a surface of the wooden board with laser beams.

In a second embodiment, a method of supporting assembly of a plurality of plate-like parts, for example, in making of a shoe last by a user from the plurality of plate-like parts obtained by cutting a wooden board based on a cutting pattern at a store will be described. A person who makes a shoe last is naturally not limited to the user but a salesperson may make the shoe last. The support is not limited to use in making of a shoe last of a custom-made shoe but may be used in a factory where shoe lasts for ready-made shoes are made.

FIG. 10 is a diagram showing overview of assembly support with the use of a cutting pattern according to the second embodiment. Initially, each of plate-like parts is assumed as being provided with a two-dimensional code Q1 in the cutting pattern shown in FIGS. 4 and 6. The two-dimensional code Q1 is naturally not limited to being provided to each plate-like part, but may be provided to any one plate-like part or a margin of a wooden board.

A user captures an image of one of a plurality of plate-like parts placed on a workbench 50 with a camera (an image pick-up unit) contained in the mobile terminal 300 as shown in FIG. 10. Since the two-dimensional code Q1 has been provided to the plate-like part the image of which was captured, the mobile terminal 300 reads a URL of a shoe last assembly support site prepared in advance in a server or the like with the use of the two-dimensional code Q1.

By accessing the site at the read URL, the mobile terminal 300 can obtain information on a position of attachment of the plate-like part the image of which was captured. FIG. 11 is a diagram showing exemplary representation shown on a display unit in assembly support according to the second embodiment. As shown, for example, in FIG. 11, a screen 40 is displayed on a display (display unit) of the mobile terminal 300. The screen 40 includes a screen 40*a* for the plate-like part 204 the image of which was picked up and a screen 40*b* showing a three-dimensional view of the completed shoe last 2. The screen 40*a* provides representation, for example, showing that the plate-like part the image of which was picked up is the plate-like part 204 fourth from the toe side. The screen 40*b* shows representation emphasizing a position of attachment of the plate-like part fourth from the toe side in the completed shoe last 2. In the screen 40*b*, the position of attachment of the plate-like part 204 the image of which was picked up can be emphasized by showing the plate-like part at the position of attachment in a color or with a line type different from that of other plate-like parts or by showing the plate-like part as blinking in a three-dimensional view of the completed shoe last 2. Though an example in which support information such as a position of attachment of a plate-like part is provided to a worker with the use of a display of the mobile terminal 300 is described, a screen such as a monitor of a PC rather than the mobile terminal 300 may be applicable. Support information for making a shoe last may be shown on a virtual reality (VR) goggle that shows virtual reality, an augmented reality (AR) goggle that shows augmented reality, or a mixed reality (MR) goggle that can show virtual reality and augmented reality.

When the identification information provided to a plate-like part is not the two-dimensional code Q1 but a number alone, similar support information is obtained also by access to a shoe last assembly support site by a user and entry of the number provided to the plate-like part. The user may naturally freely do assembly based on the number or the identification information provided to the plate-like part without accessing the support site, or an assembly manual based on the number or the identification information provided to the plate-like part may be prepared.

SUMMARY

As set forth above, the cutting support apparatus 100 is a cutting support apparatus that generates a cutting pattern for cutting a plurality of plate-like parts that form a shoe last from a plate-like member. The cutting support apparatus 100 includes an input unit 106 that receives shoe last data, a storage 110 in which a shape and a type of the plurality of plate-like parts are stored, a processor 102 that generates the cutting pattern for cutting the plurality of plate-like parts from the plate-like member having a predetermined size based on the shoe last data received by the input unit 106 and the shape of the plurality of plate-like parts stored in the storage 110, and an output unit 108 that outputs the cutting pattern computed by the processor 102. The processor 102 divides an area of plate-like parts to be arranged in the plate-like member into a plurality of areas in accordance with the type of the plate-like parts that form the shoe last, and determines positions of the plurality of plate-like parts to be arranged in each of the areas based on an arrangement condition and generates the cutting pattern.

Thus, the cutting support apparatus 100 can generate a cutting pattern suitable for making of a shoe last by cutting a plurality of plate-like parts from a plate-like member and assembling the plurality of plate-like parts.

The processor 102 may determine a position of each of the areas in the plate-like member based on the arrangement condition. The cutting support apparatus 100 can thus appropriately support a position of each area.

An order of assembly of the plurality of plate-like parts may further be stored in the storage 110, and the arrangement condition may include at least one of a condition of alignment of the plurality of plate-like parts in the order of assembly and a condition of minimization of an area of each of the areas where the plurality of plate-like parts are arranged. The cutting support apparatus 100 can thus generate the cutting pattern in consideration of at least one of minimization of the area of the area and the order of assembly.

The order of assembly of the plurality of plate-like parts may be performed in an order from a toe side. The cutting support apparatuses 100 can thus generate the cutting pattern in consideration of the order in assembly in the order from the toe side.

The arrangement condition may further include a condition of minimization of a time period for cutting the plurality of plate-like parts to be arranged in each of the areas. This cutting support apparatus 100 can thus generate the cutting pattern that achieves a shorter time period for making a shoe last.

The arrangement condition may further include a condition that orientations of the plurality of plate-like parts to be arranged in each of the areas are identical. The cutting support apparatus 100 can thus facilitate recognition by the user of the type of the cut plate-like part to thereby facilitate assembly.

The processor 102 may generate the cutting pattern in which the plurality of plate-like parts are arranged, as being distributed among a plurality of plate-like members. The cutting pattern may be generated as being distributed among a plurality of plate-like members.

When the cutting pattern requires a predetermined number or more of plate-like members, the processor 102 may generate the cutting pattern with the number of plate-like parts to be arranged in the plate-like members being reduced from the plurality of plate-like parts. The cutting support apparatus 100 can thus generate a cutting pattern with less material loss in cutting of a plurality of plate-like parts from a plate-like member.

The processor 102 may generate the cutting pattern, with a plate-like part that has less effect on the shape of the shoe last among the plurality of plate-like parts being reduced. The cutting support apparatus 100 can thus generate a cutting pattern with less material loss in cutting of a plurality of plate-like parts from a plate-like member without accuracy of the shoe last being effected.

The processor 102 may generate the cutting pattern in which identification information is provided to each of the plurality of plate-like parts. The cutting support apparatus 100 can thus generate a cutting pattern suitable for making of a shoe last by assembling a plurality of plate-like parts.

The processor 102 may provide the identification information to the cutting pattern such that orientations of the identification information are identical after the plurality of plate-like parts are assembled. The cutting support apparatus 100 can thus generate a cutting pattern that facilitates recognition by a user of identification information in making a shoe last by assembling a plurality of plate-like parts.

A cutting system 10 is a system that generates a cutting pattern for cutting a plurality of plate-like parts that form a shoe last from a plate-like member and cuts the plurality of plate-like parts from the plate-like member based on the generated cutting pattern. The cutting system 10 includes a cutting support apparatus 100 that generates the cutting pattern and a cutting apparatus 400 that cuts the plurality of plate-like parts from the plate-like member based on the cutting pattern computed by the cutting support apparatus 100. The cutting system 10 can thus generate a cutting pattern suitable for making of a shoe last by cutting a plurality of plate-like parts from a plate-like member and assembling the plurality of plate-like parts.

A cutting pattern generation method is a method of generating a cutting pattern for cutting a plurality of plate-like parts that form a shoe last from a plate-like member. The cutting pattern generation method includes receiving shoe last data, generating the cutting pattern for cutting the plurality of plate-like parts from the plate-like member having a predetermined size based on the received shoe last data and a shape of the plurality of plate-like parts stored in a storage 110, and outputting the computed cutting pattern. The generating the cutting pattern includes dividing an area of plate-like parts to be arranged in the plate-like member into a plurality of areas in accordance with a type of the plate-like parts that form the shoe last and determining positions of the plurality of plate-like parts to be arranged in each of the areas based on an arrangement condition. Thus, with the cutting pattern generation method, a cutting pattern suitable for making of a shoe last by cutting a plurality of plate-like parts from a plate-like member and assembling the plurality of plate-like parts can be generated.

OTHER MODIFICATIONS

Data in the storage 110 may be stored in a data server at a store, a data server arranged at a manufacturer different from the store, or a data server at another location. The data server may be implemented in a form of a cloud service.

The shoe last described above is by way of example and not limited thereto. For example, a hybrid shoe last having a toe portion composed of a plurality of plate-like parts and having a partial region such as a portion from a midfoot portion to a heel portion composed of solid parts made of a thermoplastic resin may be applicable.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A cutting support apparatus that generates a cutting pattern for cutting a plurality of plate parts that form a shoe last from a plate member, the cutting support apparatus comprising:

a memory configured to store part information indicating a plurality of areas of subsets of the plurality of plate parts that form the shoe last; and a processor configured to:

obtain shoe last data of the shoe last generated based on a three-dimensional foot shape data of a foot of a user, determine a plurality of cutting areas to be cut in the plate member corresponding to the plurality of areas of the subsets of the plurality of plate parts that form the shoe last based on the part information, determine, for each subset of the plurality of plate parts in each area of the plurality of areas of the plurality of plate parts that form the shoe last, an arrangement of cutting positions of the subset of the plurality of plate parts in the plurality of cutting areas based on an arrangement condition, and generate the cutting pattern based on the plurality of cutting areas and the arrangement of cutting positions, wherein the plurality of areas includes a foot width direction part of the shoe last and a malleolus part of the shoe last, the foot width direction part includes a toe part of the shoe last, an instep part of the shoe last, and an ankle part of the shoe last, and the malleolus part of the shoe last includes a medial malleolus part of the shoe last and a lateral malleolus part of the shoe last.

2. The cutting support apparatus according to claim 1, wherein the processor is configured to determine a position of each cutting area of the plurality of cutting areas to be cut in the plate member based on the arrangement condition.

3. The cutting support apparatus according to claim 2, wherein the memory is further configured to store an order of assembly of the plurality of plate parts, and the arrangement condition includes at least one of a condition of alignment of the plurality of plate parts in the order of assembly and a condition of minimization of an area of each of the plurality of cutting areas.

4. The cutting support apparatus according to claim 3, wherein the order of assembly of the plurality of plate parts is performed in an order from a toe side of the shoe last.

5. The cutting support apparatus according to claim 1, wherein the memory is further configured to store an order of assembly of the plurality of plate parts, and the arrangement condition includes at least one of a condition of alignment of the plurality of plate parts in the order of assembly and a condition of minimization of an area of each of the plurality of cutting areas.

6. The cutting support apparatus according to claim 5, wherein the order of assembly of the plurality of plate parts is performed in an order from a toe side of the shoe last.

7. The cutting support apparatus according to claim 5, wherein the arrangement condition further includes a condition of minimization of a time period for cutting the plurality of plate parts to be arranged in each of the plurality of cutting areas.

8. The cutting support apparatus according to claim 7, wherein the arrangement condition further includes a condition that orientations of the plurality of plate parts to be arranged in each of the plurality of cutting areas are identical.

9. The cutting support apparatus according to claim 5, wherein the arrangement condition further includes a condition that orientations of the plurality of plate parts to be arranged in each of the plurality of cutting areas are identical.

10. The cutting support apparatus according to claim 5, wherein the processor is configured to generate the cutting pattern in which identification information is provided to each of the plurality of plate parts.

11. The cutting support apparatus according to claim 10, wherein the processor is configured to provide the identification information to the cutting pattern such that orientations of the identification information are identical after the plurality of plate parts are assembled.

12. The cutting support apparatus according to claim 1, wherein the processor is configured to generate the cutting pattern in which the plurality of plate parts are arranged as being distributed among a plurality of plate members.

13. The cutting support apparatus according to claim 12, wherein when the cutting pattern requires a plurality of plate members, the processor is configured to generate the cutting pattern with a number of the plurality of plate parts to be arranged in the plurality of plate members being reduced from the plurality of plate parts.

14. The cutting support apparatus according to claim 13, wherein the processor is configured to generate the cutting pattern, with a plate part among the plurality of plate parts being omitted based on a difference in size or shape from an adjacent plate part.

15. The cutting support apparatus according to claim 1, wherein the plurality of areas includes a toe part of the shoe last, an instep part of the shoe last, an ankle part of the shoe last, the malleolus part of the shoe last, a foot length part of the shoe last, a heel height part of the shoe last, and a circumferential heel part of the shoe last.

16. A cutting system that generates a cutting pattern for cutting a plurality of plate parts that form a shoe last from a plate member and cuts the plurality of plate parts from the plate member based on the cutting pattern, the cutting system comprising:

a cutting support apparatus configured to generate the cutting pattern; and a cutting apparatus configured to cut the plurality of plate parts from the plate member based on the cutting pattern computed by the cutting support apparatus, wherein the cutting support apparatus includes:

a memory configured to store part information indicating a plurality of areas of subsets of the plurality of plate parts that form the shoe last; and a processor configured to:

obtain shoe last data of the shoe last generated based on a three-dimensional foot shape data of a foot of a user, determine a plurality of cutting areas to be cut in the plate member corresponding to the plurality of areas of the subsets of the plurality of plate parts that form the shoe last based on the part information, determine, for each subset of the plurality of plate parts in each area of the plurality of areas of the plurality of plate parts that form the shoe last, an arrangement of cutting positions of the subset of the plurality of plate parts in the plurality of cutting areas based on an arrangement condition, and generate the cutting pattern, wherein the plurality of areas includes a foot width direction part of the shoe last and a malleolus part of the shoe last, the foot width direction part includes a toe part of the shoe last, an instep part of the shoe last, and an ankle part of the shoe last, and the malleolus part of the shoe last includes a medial malleolus part of the shoe last and a lateral malleolus part of the shoe last.

17. A cutting pattern generation method of generating a cutting pattern for cutting a plurality of plate parts that form a shoe last from a plate member, the cutting pattern generation method comprising:

obtaining part information indicating a plurality of areas of subsets of the plurality of plate parts that form the shoe last;

obtaining shoe last data generated based on a three-dimensional foot shape data of a foot of a user;

determining a plurality of cutting areas to be cut in the plate member corresponding to the plurality of areas of the subsets of the plurality of plate parts that form the shoe last based on the part information;

determining, for each subset of the plurality of plate parts in each area of the plurality of areas of the plurality of plate parts that form the shoe last, an arrangement of cutting positions of the subset of the plurality of plate parts in the plurality of cutting areas based on an arrangement condition; and generating the cutting pattern based on the plurality of cutting areas and the arrangement of cutting positions, wherein the plurality of areas includes a foot width direction part of the shoe last and a malleolus part of the shoe last, the foot width direction part includes a toe part of the shoe last, an instep part of the shoe last, and an ankle part of the shoe last, and the malleolus part of the shoe last includes a medial malleolus part of the shoe last and a lateral malleolus part of the shoe last.

* * * * *